United States Patent [19]
Heinold et al.

[11] B 3,990,162
[45] Nov. 9, 1976

[54] RETAINING MEANS FOR EARTHWORKING TIPS

[75] Inventors: Lloyd K. Heinold; Eugene L. Helton, both of Peoria, Ill.

[73] Assignee: Caterpillar Tractor Co., Peoria, Ill.

[22] Filed: Oct. 1, 1974

[21] Appl. No.: 511,099

[44] Published under the second Trial Voluntary Protest Program on February 3, 1976 as document No. B 511,099.

[52] U.S. Cl. ............................ 37/142 A; 24/218; 85/5 N; 85/8.3; 85/8.8; 279/97; 299/92; 403/318

[51] Int. Cl.² .................. E02F 9/28; F16B 21/07; F16B 21/18

[58] Field of Search ............... 37/142 A; 299/92; 85/8.3, 8.6, 8.8, 8.9, 5 N, 5 R; 279/97, 86; 403/203, 318, 408; 277/164; 24/218

[56] References Cited
UNITED STATES PATENTS

| | | | |
|---|---|---|---|
| 908,429 | 12/1908 | Tobey | 85/8.8 X |
| 968,036 | 8/1910 | Erickson | 85/8.8 |
| 1,114,123 | 10/1914 | Dalton | 85/8.8 X |
| 2,385,565 | 9/1945 | Cox | 85/8.8 X |
| 2,427,651 | 9/1947 | Baer | 37/142 A |
| 2,657,482 | 11/1953 | Laonder et al. | 85/8.3 X |
| 2,774,430 | 12/1956 | Blazek | 403/318 X |
| 2,948,317 | 8/1960 | Munro | 85/8.8 X |
| 2,957,717 | 10/1960 | Bram | 277/164 X |
| 3,107,409 | 10/1963 | Arthaud et al. | 24/218 |
| 3,217,774 | 11/1965 | Pelochino | 85/8.8 X |
| 3,410,010 | 11/1968 | Ratkowski | 37/142 A |
| 3,445,120 | 5/1969 | Barr | 277/164 |
| 3,690,728 | 9/1972 | Krekeler | 299/92 |
| 3,740,876 | 6/1973 | Solokhin et al. | 37/142 A |
| 3,801,210 | 4/1974 | Heinold et al. | 37/142 A X |

FOREIGN PATENTS OR APPLICATIONS

| | | | |
|---|---|---|---|
| 972,195 | 1/1951 | France | 37/142 A UX |
| 976,239 | 3/1951 | France | 85/8.8 |
| 815,428 | 8/1951 | Germany | 85/8.8 |
| 2,015,662 | 11/1970 | Germany | 37/142 A |
| 221,075 | 8/1942 | Switzerland | 85/8.6 |
| 448,621 | 4/1968 | Switzerland | 85/8.8 |
| 1,100,015 | 1/1968 | United Kingdom | 299/92 |

*Primary Examiner*—Edgar S. Burr
*Assistant Examiner*—Steven A. Bratlie
*Attorney, Agent, or Firm*—Phillips, Moore, Weissenberger, Lempio & Strabala

[57] ABSTRACT

An earthworking device comprises an adapter having a tip detachably mounted on a forward end thereof. A flat pin of rectangular cross section, disposed in aligned bores formed through the adapter and the tip, is held in place by a triangularly shaped spring clip which straddles notches formed on the pin.

12 Claims, 3 Drawing Figures

RETAINING MEANS FOR EARTHWORKING TIPS

BACKGROUND OF THE INVENTION

Hardened earthworking tips or teeth, such as those employed on rippers, scarifiers and loader buckets, must be held securely in place on a support member and yet be capable of expeditious removal for replacement purposes. Loss of the tip will subject the support member or adapter therefor to damage, thus requiring rather expensive and time consuming replacement thereof. Also, when a hardened tip is employed in conjunction with a rock crushing operation, for example, loss of the tip could cause severe damage to the rock crushing equipment should it become digested thereby.

Conventional retaining means for securing various work tools, such as hardened tips or teeth, in place on conventional earthworking equipment are exemplified by U.S. Pat. Nos. 2,994,140; 3,274,908 and 3,624,827. The latter two patents are assigned to the assignee of this application.

SUMMARY OF THE INVENTION

An object of this invention is to provide an improved and economical retaining means for positively locking a work tool on a support member and for permitting expeditious replacement thereof. A pin is disposed in aligned bores formed through the work tool and the support member and the retaining means, comprising an expansible triangularly shaped spring clip, straddles the pin in locked engagement within notches formed on opposite sides thereof. The spring clip is preferably at least substantially encapsulated by an elastomeric member to further aid in maintaining such locked engagement.

BRIEF DESCRIPTION OF THE DRAWING

Other objects of this invention will become apparent from the following description and accompanying drawing wherein.

DETAILED DESCRIPTION

Figure 1:
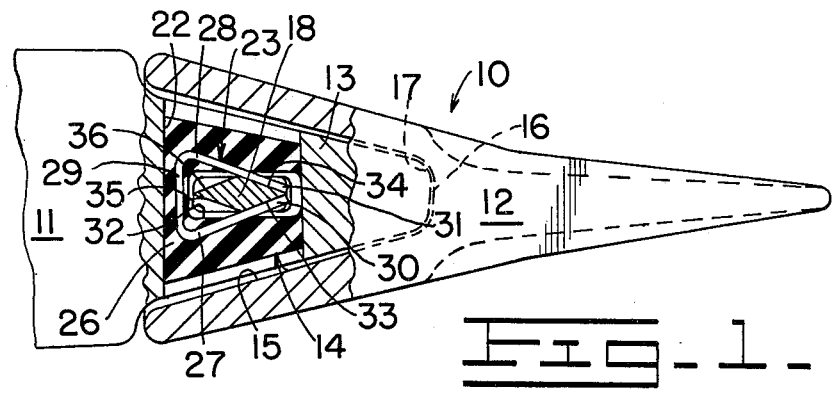
FIG. 1 is a partially sectioned, side elevational view of an earthworking device comprising a work tool attached on a support member by a retaining means of this invention.

FIG. 1 illustrates an earthworking device 10 comprising a support member or adapter 11 having a work tool 12 detachably mounted on a forward end 13 thereof by a retaining means 14 of this invention. The work tool preferably comprises a hardened earthworking tip or tooth mounted on a ripper shank. The tip may also be used on scarifiers or on the cutting edge of a loader bucket, for example.

Forward end 13 of the support member is preferably wedge-shaped. A wedge-shaped recess 15 is formed in tip 12 to accommodate the like-shaped forward end 13 of the support member. The support member preferably terminates at its apex or nose at a flat surface portion 16, adapted to at least partially abut a surface portion 17 formed at the apex of recess 15, to substantially absorb impact forces thereat.

Figure 2:
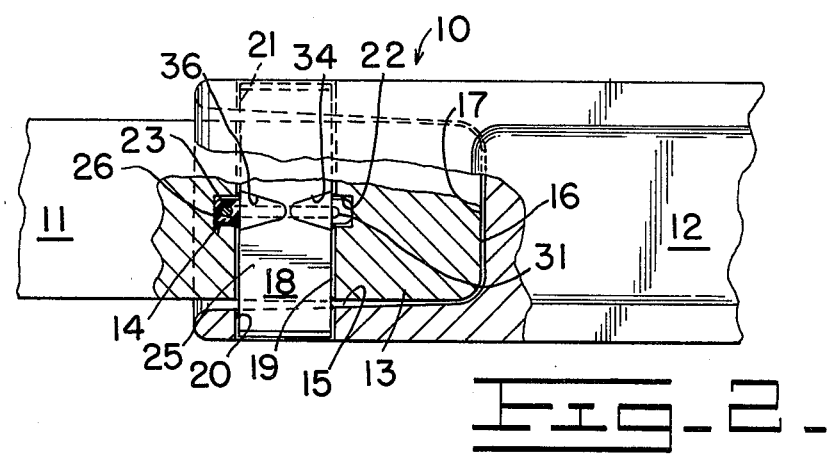
FIG. 2 is a partially sectioned top plan view thereof.
Figure 3:
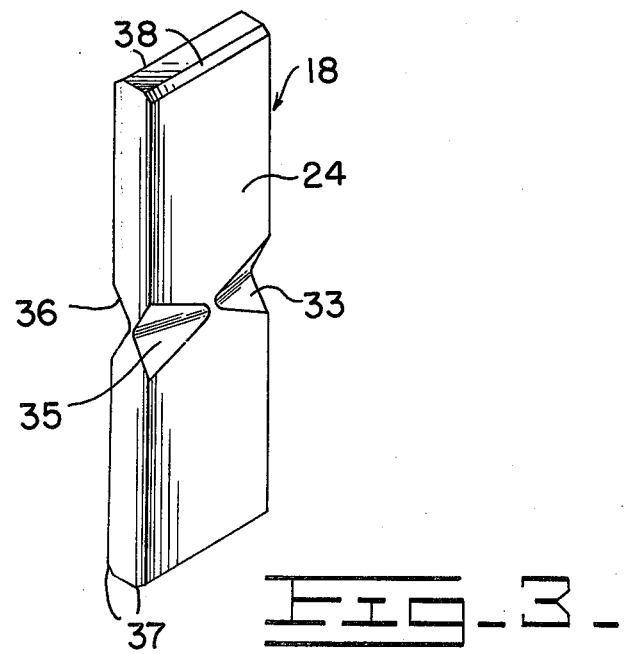
FIG. 3 is an enlarged isometric view of a retaining pin used in conjunction with the retaining means.

A pin 18, rectangular substantially throughout its entire length as shown in FIG. 3, is disposed in slip-fit relationship within a first rectangular aperture 19 formed in the support member (FIG. 2). A pair of laterally spaced second and third rectangular apertures 20 and 21 are formed through the sidewalls of the tip to straddle the first aperture in axial alignment therewith. Each of the latter two apertures preferably have an inside dimension which is slightly larger than the outside perimeter of the pin to prevent the imposition of shear loads on the pin during operation of the tip, i.e., such loads will be at least substantially absorbed at surface 16 of the support member.

The retaining means is disposed in a wedge-shaped recess 22 formed centrally in forward end 13 of support member 11, intermediate opposite ends of pin 18. The retaining means comprises a wire spring clip 23 in the form of an isosceles triangle and disposed to straddle opposite sides 24 and 25 of the pin. The spring clip may be composed of a conventional spring steel or resilient wire-like material, exhibiting the desired resiliency and spring-back capabilities required for pin retention purposes. It should be understood that two or more such retaining means may be utilized for work tool applications requiring greater retention capabilities.

The spring clip is preferably at least substantially encapsulated by an elastomeric member 26, having a wedge-shaped cross section taken transversely relative to a longitudinal axis of pin 18, comprising a part of the retaining means and preferably composed of a reinforced rubber material. The spring clip comprises a pair of converging leg portions 27 and 28, disconnected at the apex thereof, integrally joined together in cantilevered relationship on a base portion 29. Inner end portions 30 and 31 of the leg portions, adjacent to the disconnected apex thereof, are exposed internally of a rectangular aperture 32 formed through member 26.

Such expansible end portions are urged radially inwardly into locked frictional engagement within notches 33 and 34 of the pin, formed intermediate the opposite ends thereof, by the elastomeric properties of member 24 and the spring-back characteristics of the clip. Each of the notches is generally V-shaped and has its base disposed on a respective edge of the pin. A second pair of like-formed notches 35 and 36 are preferably formed on the opposite side of the pin to provide a diamond-shaped cross section transversely of a longitudinal axis of the pin thereat (FIG. 1).

Upon assembly, retaining means 14 is initially placed in recess 22 and tip 12 is then suitably positioned on forward end portion 13 of the support member. Pin 18 is then driven manually through aligned bores 19, 20 and 21 by a suitable drift punch and hammer to expand the snap leg portions 30 and 31 of the spring clip into locked frictional engagement within notches 33 and 34. Second pair of notches 35 and 36 facilitate reversal of the pin for installation purposes. Bevelled ends 37 and 38 of the pin (FIG. 3) facilitate expansion of the spring clip when the pin is inserted therethrough. When it is desired to replace the tip, the pin may be driven in a reverse manner to release it from retaining means 14.

We claim:

1. In an earthworking device comprising a support member, a work tool mounted on a forward end of said support member, a pin having at least one pair of notches formed on opposite sides thereof and disposed in aligned apertures formed through said support member and said work tool and retaining means releasably holding said pin in said apertures, the improvement wherein said retaining means comprises an elastomeric member having said pin extending through an aperture formed therethrough and an expansible triangularly shaped and unitary spring clip comprising a base portion and a pair of leg portions cantilevered on said base portion, the ends of said leg portions remote from said base portion being exposed internally of the aperture formed through said elastomeric member and straddling opposite sides of said pin in locked engagement within the notches thereof and remaining portions of said leg portions and said base portion being totally encapsulated within said elastomeric member.

2. The earthworking device of claim 1 wherein said tool constitutes a hardened earthworking tip.

3. The earthworking device of claim 1 wherein two pairs of said notches, each having a V-shape, are formed on opposite sides of said pin to provide a diamond shaped transverse cross section at a location along its length, said cross section being defined by said notches.

4. The earthworking device of claim 1 wherein said pin has a rectangular cross section substantially throughout its entire length.

5. The earthworking device of claim 4 wherein said pin has a pair of parallel edges at each end thereof and wherein said edges are bevelled to facilitate expeditious installation thereof through said aligned apertures.

6. The earthworking device of claim 1 wherein said elastomeric member is shaped complimentary to a recess formed in said support member and is disposed therein.

7. The earthworking device of claim 6 wherein said elastomeric member has a wedge-shaped cross section, taken transversely relative to a longitudinal axis of said pin.

8. The earthworking device of claim 7 wherein said recess is formed in said support member, intermediate opposite ends of said pin.

9. The earthworking device of claim 1 wherein a forward end portion of said support member is wedge-shaped and wherein said work tool has a wedge-shaped recess formed therein and disposed in accommodating relationship on the wedge-shaped forward end portion of said support member, the apexes of each of the wedge-shaped forward portion of said support member and the wedge-shaped recess formed in said work tool abutting each other.

10. The earthworking device of claim 1 wherein said apertures comprise a first rectangular aperture formed through said support member and a pair of laterally spaced second and third rectangular apertures disposed on either side of said first aperture and formed through said work tool.

11. An earthworking tip retaining means comprising an elastomeric member having an aperture formed therethrough and a unitary spring clip composed of a resilient wire bent into triangular form to constitute a base portion and a pair of converging leg portions each cantilevered on said base portion, the ends of said leg portions remote from said base portion being exposed internally of said aperture and the remaining portions of said leg portions and said base portion being totally encapsulated within said elastomeric member.

12. The spring clip of claim 11 wherein said spring clip is formed as an isosceles triangle.

* * * * *